US011102523B2

(12) United States Patent
Kumar et al.

(10) Patent No.: US 11,102,523 B2
(45) Date of Patent: Aug. 24, 2021

(54) SYSTEMS AND METHODS FOR SELECTIVE AUDIO SEGMENT COMPRESSION FOR ACCELERATED PLAYBACK OF MEDIA ASSETS BY SERVICE PROVIDERS

(71) Applicant: Rovi Guides, Inc., San Jose, CA (US)

(72) Inventors: Neeraj Kumar, Saran (IN); Vishwas Sharadanagar Panchaksharaiah, Tumkur District (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/357,725

(22) Filed: Mar. 19, 2019

(65) Prior Publication Data

US 2020/0304842 A1 Sep. 24, 2020

(51) Int. Cl.

| | |
|---|---|
| ***H04N 21/8549*** | (2011.01) |
| ***H04N 21/233*** | (2011.01) |
| ***H04N 21/845*** | (2011.01) |
| ***H04N 21/472*** | (2011.01) |
| ***H04N 21/43*** | (2011.01) |
| *G06K 9/00* | (2006.01) |

(52) U.S. Cl.

CPC ....... *H04N 21/233* (2013.01); *H04N 21/4307* (2013.01); *H04N 21/47217* (2013.01); *H04N 21/8456* (2013.01); *G06K 9/00751* (2013.01); *H04N 21/8549* (2013.01)

(58) Field of Classification Search

CPC ................ G06F 16/345; G06F 16/739; H04N 21/23439; H04N 21/8549; G06K 9/00751

See application file for complete search history.

(56) References Cited

U.S. PATENT DOCUMENTS 5,583,653 A 12/1996 Timmermans
5,781,696 A 7/1998 Oh
5,995,153 A 11/1999 Moeller
6,370,315 B1 4/2002 Mizuno
6,484,137 B1 11/2002 Taniguchi
7,065,485 B1 6/2006 Chong-White
7,136,571 B1 11/2006 Dagtas
(Continued)

FOREIGN PATENT DOCUMENTS

EP 3382706 A1 10/2018
WO 2012160771 11/2012

*Primary Examiner* — Thomas H Maung
(74) *Attorney, Agent, or Firm* — Haley Guiliano LLP

(57) ABSTRACT

Systems and methods are disclosed herein for selective audio segment compression for accelerated playback of media assets by service providers. A playback speed of the video segment of a media asset is calculated based on the duration of the video segment and a received playback time period. The system receives audio segments and corresponding priority weights. The audio segments with the lowest priority weight are removed from the group of various audio segments. The system then determines whether the duration of the remaining audio segments exceeds the received playback time period. If so, the system modifies the remaining audio segments by removing another audio segment with the lowest priority weight from the remaining audio segments. The system then rechecks whether the received playback time period is exceeded. If not, the system generates for playback the video segment based on the video playback speed and the remaining audio segments.

20 Claims, 11 Drawing Sheets

(56) References Cited

U.S. PATENT DOCUMENTS

| | | | | |
|---|---|---|---|---|
| 7,149,412 | B2 | 12/2006 | Blair | |
| 7,260,439 | B2 | 8/2007 | Foote | |
| 7,313,808 | B1 | 12/2007 | Gupta et al. | |
| 7,426,470 | B2 | 9/2008 | Chu | |
| 7,612,832 | B2 | 11/2009 | Zhang | |
| 7,809,241 | B2 | 10/2010 | Blair | |
| 8,032,360 | B2 | 10/2011 | Chen | |
| 9,214,190 | B2 | 12/2015 | Lin | |
| 9,270,964 | B1 * | 2/2016 | Tseytlin | H04N 9/806 |
| 9,788,062 | B2 | 10/2017 | Dimov et al. | |
| 1,033,997 | A1 | 7/2019 | Luo | |
| 10,419,830 | B2 | 9/2019 | Packard et al. | |
| 10,433,030 | B2 | 10/2019 | Packard et al. | |
| 10,504,554 | B2 | 12/2019 | Takahashi | |
| 10,708,633 | B1 | 7/2020 | Kumar et al. | |
| 10,878,835 | B1 | 12/2020 | Pedruzzi et al. | |
| 2002/0093591 | A1 * | 7/2002 | Gong | G06K 9/6293 348/515 |
| 2003/0063407 | A1 | 4/2003 | Zimmerman | |
| 2003/0165327 | A1 | 9/2003 | Blair | |
| 2003/0231871 | A1 | 12/2003 | Ushimaru | |
| 2004/0143434 | A1 * | 7/2004 | Divakaran | G06K 9/00711 704/256 |
| 2004/0170385 | A1 | 9/2004 | Bhadkamkar | |
| 2004/0267388 | A1 | 12/2004 | Perdon | |
| 2005/0078113 | A1 | 4/2005 | Goldhor | |
| 2005/0207733 | A1 | 9/2005 | Gargi | |
| 2006/0165379 | A1 | 7/2006 | Agnihotri | |
| 2006/0221788 | A1 | 10/2006 | Lindahl et al. | |
| 2006/0239644 | A1 * | 10/2006 | Barbieri | G11B 27/105 386/226 |
| 2006/0293883 | A1 | 12/2006 | Endo et al. | |
| 2008/0037953 | A1 | 2/2008 | Kawamura et al. | |
| 2008/0221942 | A1 * | 9/2008 | Agnihotri | G11B 27/322 705/7.33 |
| 2008/0232775 | A1 | 9/2008 | Ljolje | |
| 2009/0041356 | A1 * | 2/2009 | Barbieri | G06F 16/739 382/190 |
| 2009/0132243 | A1 | 5/2009 | Suzuki | |
| 2010/0023964 | A1 * | 1/2010 | Basso | H04N 21/4331 725/32 |
| 2010/0088330 | A1 | 4/2010 | Komiya | |
| 2012/0076357 | A1 * | 3/2012 | Yamamoto | G06K 9/00711 382/103 |
| 2014/0028848 | A1 | 1/2014 | Takenaka | |
| 2014/0255000 | A1 | 9/2014 | Kao et al. | |
| 2014/0321831 | A1 | 10/2014 | Olsen | |
| 2015/0078562 | A1 | 3/2015 | Shanmugasundaram et al. | |
| 2015/0098691 | A1 | 4/2015 | Avrahaml | |
| 2015/0170670 | A1 | 6/2015 | Luyten | |
| 2015/0332732 | A1 | 11/2015 | Gilson et al. | |
| 2016/0323482 | A1 * | 11/2016 | Chung | H04N 21/4333 |
| 2017/0004858 | A1 | 1/2017 | Ngiam | |
| 2017/0300752 | A1 * | 10/2017 | Biswas | G06K 9/726 |
| 2017/0347135 | A1 | 11/2017 | Frantz | |
| 2018/0268866 | A1 * | 9/2018 | Takahashi | H04N 21/8549 |
| 2018/0285496 | A1 | 10/2018 | Le Chevalier et al. | |
| 2018/0350388 | A1 | 12/2018 | Jain | |
| 2020/0186728 | A1 | 6/2020 | Pena | |
| 2020/0304844 | A1 | 9/2020 | Kumar | |

* cited by examiner

Exemplary Predefined Priority Scheme 200

| Audio Portion Type | Priority Weight | Audio Portion Type Parameters |
| --- | --- | --- |
| Dialogue | 0.9 | Freq_Response.dialogue<br>Signal_Profile.dialogue<br>Parameter_Data.dialogue |
| Environmental Sound Effects | 0.7 | Freq_Response.environsfx<br>Signal_Profile.environsfx<br>Parameter_Data.Environsfx |
| Foreground Music | 0.6 | Freq_Response.foremusic<br>Signal_Profile.foremusic<br>Parameter_Data.Foremusic |
| Background Music | 0.3 | Freq_Response.backmusic<br>Signal_Profile.backmusic<br>Parameter_Data.backmusic |
| Silences | 0.2 | Freq_Response.silence<br>Signal_Profile.silence<br>Parameter_Data.silence |

FIG. 2

Exemplary Varied Audio Segment Compression 300

310 Media Compression System

320

$$\text{Playback time period} = \frac{\text{Length of AudioSegDialogue}}{1 \cdot x} + \frac{\text{Length of AudioSegForeground}}{2 \cdot x} + \frac{\text{Length of AudioSegBackground}}{2.5 \cdot x} + \frac{\text{Length of AudioSegSilence}}{3 \cdot x}$$

330

$$15\ minutes = \frac{8\ minutes}{1 \cdot x} + \frac{3\ minutes}{2 \cdot x} + \frac{6\ minutes}{2.5 \cdot x} + \frac{13\ minutes}{3 \cdot x}$$

340

$x = 1.08$

*Dialogue plays at:* 1.08x
*Foreground plays at:* 2.16x
*Background plays at:* 2.7x
*Silence plays at:* 3.24x

SYSTEMS AND METHODS FOR SELECTIVE AUDIO SEGMENT COMPRESSION FOR ACCELERATED PLAYBACK OF MEDIA ASSETS BY SERVICE PROVIDERS

BACKGROUND

The present disclosure is directed to techniques for audio compression, more particularly, audio segment compression for accelerated playback of media assets by service providers.

SUMMARY

Conventional approaches for accelerating playback of media assets provide for synchronized playback of both audio and video segments of the media asset. The audio segments are altered to increase playback speed such that the audio segments uniformly scale to the rate of video playback. Additionally, the uniformly accelerated audio segments often result in an increased pitch resulting in a difficult experience for user comprehension. In these conventional approaches, audio-manipulation techniques are implemented to mitigate the increased pitch of the audio segments. However, techniques for selectively compressing specific audio segments used in the media asset within a predefined playback time period remains technically challenging, as conventional approaches cannot effectively select which of the various audio segments from a media asset are to be played back within a predefined playback time period, nor can conventional approaches select specific compression rates for various audio segments for playback within a predefined playback time period while retaining audio comprehension by the user.

Accordingly, techniques are disclosed herein for selective audio segment compression for accelerated playback of media assets. The disclosed techniques calculate a playback speed of the video segment of a media asset based on the duration of the video segment and a received playback time period (e.g., the truncated time period a user has to watch the media—potentially the length of the user's commute to work). The system determines the various audio segments of the media asset. Each audio segment is analyzed for similarity based on the segment being of a similar type of audio content. A priority weight for each of the audio segments is then determined. The audio segments with the lowest priority weight are removed from the group of audio segments. The system then determines whether the duration of the remaining audio segments exceeds the received playback time period. If so, the system modifies the remaining audio segments by removing another audio segment with the lowest priority weight from the remaining audio segments. The system then rechecks whether the duration of remaining audio segments exceeds the received playback time period. If not, the system generates for playback the video segment based on the video playback speed and the remaining audio segments.

In some embodiments disclosed herein, the disclosed techniques calculate a varied audio segment compression determination for accelerated playback of media assets. Each audio segment for use during accelerated playback is based on the priority weight of that audio segment, the received playback time period, and a duration of that audio segment. A sum of the modified time for each audio segment equals the received playback time period. The system determines an accelerated playback speed for each audio segment based on the modified time for that audio segment and the duration of that audio segment. The system then generates for playback the video segment based on the video playback speed and the audio segments based on the accelerated playback speed for each audio segment.

A number of techniques for determining corresponding priority weights for the audio segments are disclosed herein. For example, a predefined priority scheme may be retrieved having a number of audio portion types and corresponding priority weights. The system then determines whether the type of audio portion of the audio segment matches a predefined audio portion type from the predefined priority scheme. If so, the system assigns the priority weight of the matching predefined audio portion type to the audio segment. In other examples, the predefined priority scheme may be based on user preferences.

In some variants, the system may receive real-time locational information from an electronic device for media asset playback. The system determines whether a subset of the real-time locational information matches a subset of historical locational information for the electronic device. If so, an estimated playback time period based on the subset of historical locational information is determined, and the system updates the received playback time period by assigning the estimated playback time period to the received playback time period.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 2 shows an illustrative diagram of an exemplary predefined priority scheme, in accordance with some embodiments of the disclosure;

FIG. 3 shows an illustrative diagram of an exemplary varied audio segment compression determination, in accordance with some embodiments of the disclosure;

DETAILED DESCRIPTION

Figure 1A:
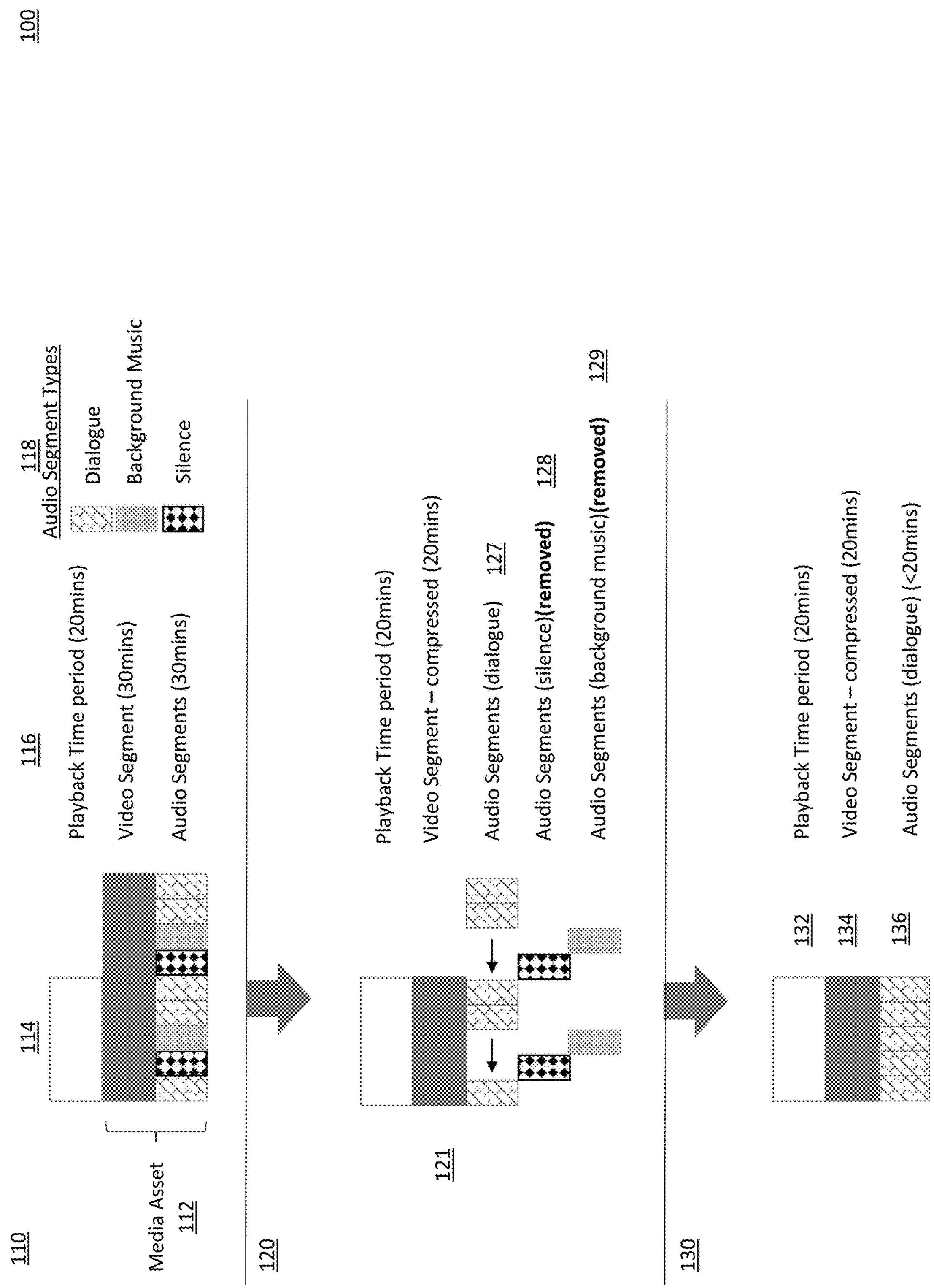
FIG. 1A shows an illustrative diagram of one technique for selective audio segment compression for a media asset, in accordance with some embodiments of the disclosure.

FIG. 1A shows an illustrative diagram 100 of one technique for selective audio segment compression for a media asset, in accordance with some embodiments of the disclosure. At time 110, prior to any compression to the media asset, a media asset 112 is shown including video segments and audio segments. The system receives a playback time period 114 which may be less than the duration of the media asset. For example, the playback time period may be twenty minutes, and the media asset playback time 116 is thirty minutes (having both video segment and audio segment at thirty-minute durations). The audio segments of the media asset may be of different audio segment types 118. For example, the audio segments types of the media asset may include segments categorized as dialogue, background music, and/or silence.

At a time 120 during the compression technique, a media compression system compresses the video segment by a corresponding factor such that the compressed video segment 121 fits within the received playback time period. The audio segment types categorized as silence 128 and background music 129 are removed from the initial group of audio segments, while the dialogue audio segment 127 remains.

At a time 130 after the compression technique has been implemented, the playback time period 132 matches the playback time of the compressed video segment 134 and playback time of the remaining audio segments 136. The remaining audio segments from the initial audio segments only contain the dialogue audio segment types and removed both audio segment types categorized as silence and/or background music.

Figure 1B:
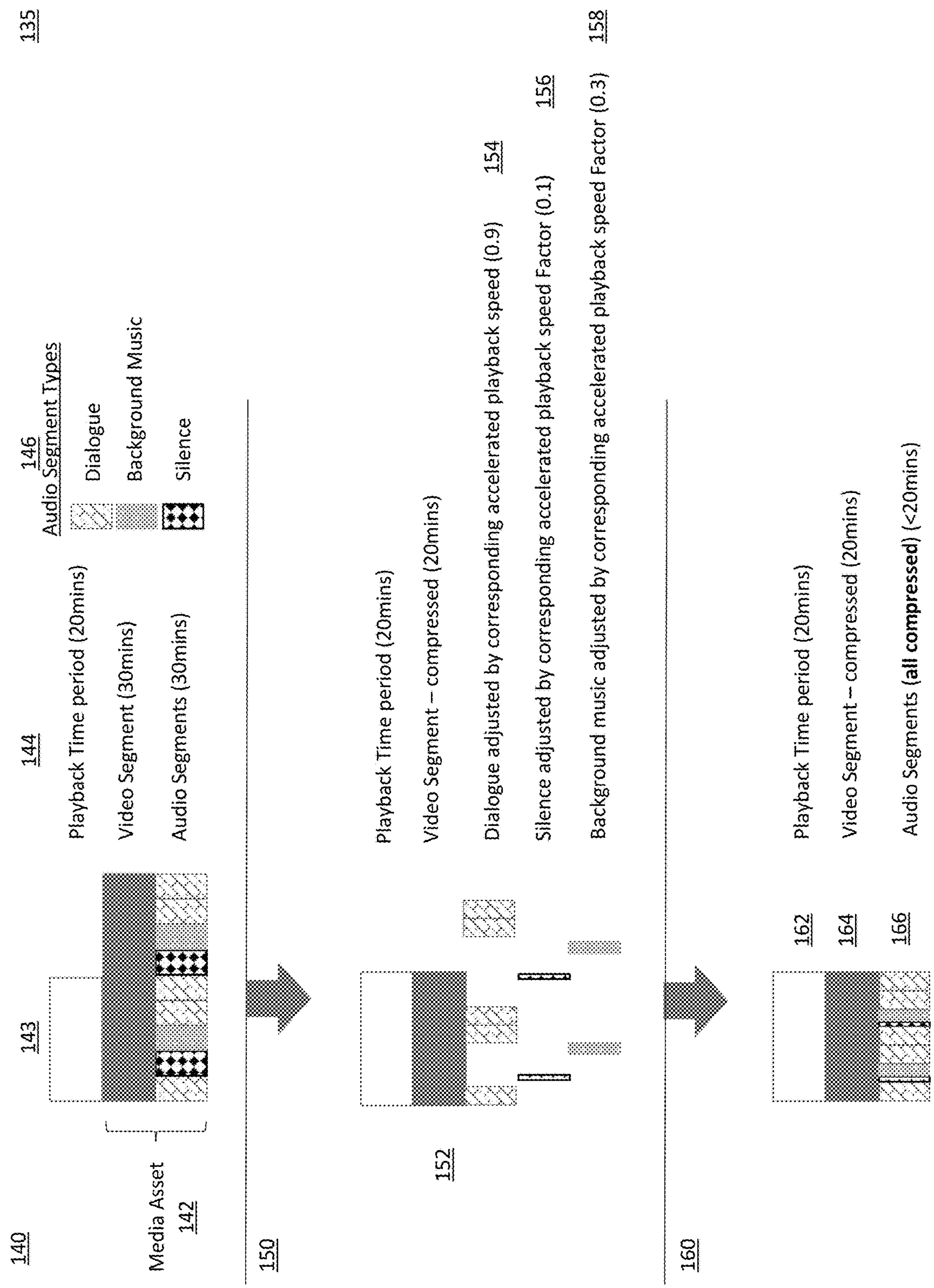
FIG. 1B shows an illustrative diagram of another technique for selective audio segment compression for a media asset, in accordance with some embodiments of the disclosure.

FIG. 1B shows an illustrative diagram 135 of another technique for selective audio segment compression for a media asset, in accordance with some embodiments of the disclosure. At a time 140 prior to any compression to the media asset, a media asset 142 is shown including video segments and audio segments. The system receives a playback time period 143 which may be less than the duration of the media asset.

At time 150, during the compression technique, a media compression system compresses the video segment by a corresponding factor such that the compressed video segment 152 fits within the received playback time period. Each type of audio segment is adjusted by a distinct corresponding accelerated playback speed. For example, the dialogue audio segment type 154 is compressed by a factor of 0.9, and the silence 156 and background music 158 audio segment types are compressed by factors of 0.1 and 0.3 respectively. In this embodiment, each of the audio segment types are retained and individually compressed by their corresponding accelerated playback factor.

At time 160, after the compression technique has been implemented, the playback time period 162 matches the playback time of the compressed video segment 164 and playback time of each of the compressed audio segments 166.

A media compression system implements these selective audio segment compression techniques for accelerated playback of media asset. The media compression system may calculate a video playback speed of a video segment of a media asset based on a received playback time period and a duration of the video segment. As an illustrative example, a user is commuting to work and uses a mobile smartphone as an electronic device for media playback to catch-up on her favorite television series. The user's commute is a twenty-minute bus ride. The smartphone user interface receives the playback time period specified by the user of twenty minutes. The media compression system then loads up the user's favorite television shows based on the user's account and preferences. The user selects the television show "True Detective" which is a crime drama of duration of thirty minutes per episode. The media compression system calculates that a video playback speed of 1.5× speed such that the thirty-minute episode of True Detective is played in the user's twenty-minute bus ride.

The media compression system utilizes techniques to analyze the video segment of the media asset separate from the audio segment of the media asset. The media compression system may receive the playback time period from an electronic device input. In other variants, the media compression system may receive the playback time period from a preset playback time period based on metadata. This metadata may include user preference information, user device history information, crowdsourced user device information, locational device information for a specific media service, and various other user/device/demographical information. The media compression system may retrieve this metadata from a data structure.

In some embodiments, the media compression system receives real-time locational information of an electronic device for media asset playback. The real-time locational information indicates movement of the electronic device. Continuing from the above example, the user's smartphone may include GPS technology which allows for the media compression system to interface with the smartphone and receive real-time locational information of the user's smartphone.

The media compression system may determine, based on historical information for the electronic device, whether a subset of the real-time locational information matches a subset of historical locational information. Responsive to the determination that the subset of the current real-time locational information matches the subset of historical locational information, the media compression system may determine an estimated playback time period based on the subset of historical locational information. A match may be based on a predefined threshold of similarity between information comparison. Then the media compression system may assign the estimated playback time period to the received playback time period. Continuing from the above example, the user typically takes the same bus route to work. Historical locational information provides that the user's electronic device has traveled this route five times a week. The media compression system determines that the user is currently on her bus ride to work and compares it against the historical information of the user's electronic device indicating that this route is taken frequently. Upon finding similarity, the media compression system assigns the received playback time period to be twenty minutes, as this is the time it takes for the user to commute to work on this bus route.

In other variants, the media compression system may use crowdsourced locational information in place of the historical locational information of the electronic device. In other variants, real-time environmental information may be used such as real-time traffic information, and/or weather information to adjust the playback time period. The media compression system may retrieve this information from the data structure. The media compression system may determine and assign revised playback time periods as new information is received. In some embodiments, the playback time period will adjust in real-time. In other embodiments, the playback time period will adjust after a sufficient difference in playback time has accrued due to change in conditions (e.g., traffic/weather).

The media compression system may determine audio segments from the media asset. Each audio segment includes one or more audio portions of similar type from the media asset. For example, a type of audio segment may be dialogue made up of many different audio portions in a media asset where dialogue occurs. The media compression system may use various mathematical and informational techniques for identifying and extracting the audio portions from audio segments of the media asset. Specifically, techniques such as Fourier Transform, Fast Fourier Transform, spectral analysis and wavelet analysis may be implemented to aid in identifying audio portions of similar type. Conversion of the audio signal from the time domain to the frequency domain (e.g., through techniques such as Fourier Transform) may aid in the extraction of similar patterns. For example, human dialogue may range from 85-255 Hz, and various filtering techniques may be used to isolate and extract audio portions from the audio segments. In situations where there is more than one audio segment type (e.g., dialogue and background music) for an audio portion, various predefined rules may determine the categorization of the audio portion to assign to a specific audio segment.

The media compression system may determine a corresponding priority weight for each of the plurality of audio segments. The media compression system may determine the corresponding priority weights based on predefined values for the various types of audio segments.

In some embodiments, the media compression system may determine a corresponding priority weight for each of the plurality of audio segments by retrieving a predefined priority scheme. The predefined priority scheme may include a plurality of audio portion types and corresponding priority weights. FIG. 2 shows an illustrative diagram 200 of an exemplary predefined priority scheme, in accordance with some embodiments of the disclosure. The audio portion types in this predefined priority scheme include dialogue, environmental sound effects, foreground music, background music, and silences. Each of the audio portion types have corresponding priority weights which may be stored as weights, values, ratios, code, machine-code, or other information to be used by the media compression system.

The media compression system may determine whether the type of the audio portions of the audio segment from the media asset match a predefined audio portion type from the predefined priority scheme. Upon successful match, the media compression system assigns the corresponding priority weight of the predefined priority scheme to the corresponding audio segment. This process may be done for each of the audio segments. Each of the audio portion types in the predefined priority scheme contain a set of audio portion type parameters. These audio portion type parameters provide for the specific bounds of the categorization of the audio portion type. Returning to FIG. 2, audio portion type parameters of each audio portion type is shown. For example, an audio portion type for dialogue includes audio portion type parameters which provide for frequency response, signal profiles for matching a compared audio portion from the audio portion types, and additional parameter data. The additional data may include further audio-based metadata for comparison. As discussed earlier, techniques such as Fourier Transform, Fast Fourier Transform, spectral analysis and wavelet analysis may be implemented to aid in identifying audio portions of similar type and may be further implemented to determine the match between the audio portions of the media asset to the audio portion type parameters from the predefined priority scheme.

In some variants, the predefined priority scheme is based at least in part on metadata. This metadata may include user preference information, user device history information, crowdsourced user device information, locational device information for a specific media service, and various other user/device/demographical information. In other embodiments, the predefined priority scheme is received from a content producer of media assets. For example, if the user if watching True Detective, the predefined priority scheme may be retrieved from Home Box Office (HBO) as the provider of this media asset. In other examples, potentially a service provider of media assets may provide the predefined priority scheme (e.g., YouTube, DIRECTV, Hulu, Comcast, Amazon: Prime Video, and similar providers).

The media compression system may modify the audio segments by removing an audio segment assigned to a lowest priority weight from the plurality of audio segments. As an illustrative example, FIG. 1A illustrates at 120, two types of audio segments, namely silence and background music, are removed from the plurality audio segments. In some embodiments, more than one audio segment may be removed from the plurality of audio segments. In this example, the lowest priority weight may include the two lowest priority weights of the plurality of audio segments.

The media compression system may modify the audio segments by determining one or more audio segments as high priority audio segments. The media compression system may modify the remaining audio segments by removing an audio segment assigned to a lowest remaining priority weight from the remaining audio segments. However, a second determination is executed by the media compression system of whether the audio segment being removed is one of the one or more high priority audio segments. As an illustrative example, FIG. 1A illustrates at 120, three types of audio segments, namely silence, background music, and dialogue. Dialogue is considered high priority. In this situation dialogue was not removed. In some variants, the determinations of one or more audio segments as high priority audio segments are received from a content producer of the media asset. For example, if the user if watching True Detective, the high priority audio segments may be retrieved from Home Box Office (HBO) as the provider of this media asset. HBO may specify that dialogue, environmental sound effects and foreground music are all considered high priority audio segments. In other examples, a service provider of media assets may provide the high priority audio segments (e.g., YouTube, DIRECTV, Hulu, Comcast, Amazon: Prime Video, and similar providers). The media compression system may retrieve the information regarding high priority segments from the data structure.

In response to the determination that the audio segment being removed is one of the one or more high priority audio segments, the media compression system may stop generation for playback of the video segment and the remaining audio segments. In the example above, if dialogue was removed, the media compression system would stop playback of the audio and video segments.

The media compression system may determine whether the duration of remaining audio segments exceeds the received playback time period. In response to determining that the duration of the remaining audio segments exceeds the received playback time period, the media compression system modifies the remaining audio segments by removing an audio segment assigned to a lowest remaining priority weight from the remaining audio segments. This process may be repeated until the remaining audio segments do not exceed the received playback time period. Alternatively, in some embodiments, there may be a maximum number of audio segments removed. Upon the maximum number of segments removed, a notification may be sent to the electronic device. The media compression system may receive instruction to continue the technique for selective audio segment compression despite the maximum number of segments having been removed. In other embodiments, the media compression system stops the technique for selective audio segment compression once the maximum number of segments has been removed.

In some variants, in response to determining that the duration of remaining audio segments does not exceed the received playback time period, the media compression system determines the time period between the received playback time period and the sum of all remaining audio segments. For example, the received playback time period is twenty minutes, and the sum of all remaining audio segments is nineteen minutes. The media compression system may then retrieve and trim the previously removed audio segment. The previously removed audio segment may be trimmed to a playback period matching the time period (e.g., one minute). The media compression system may then add the trimmed removed audio segment to the remaining audio segments. Continuing from the example above, if the previously removed segment was a segment of three minutes, this segment would be trimmed to one minute and added to the remaining audio segments. The sum of the remaining audio segments would now be equal to the playback time period.

In response to determining that the duration of remaining audio segments does not exceed the received playback time period, the media compression system generates for playback the video segment based on the video playback speed and the remaining audio segments. Continuing from the initial example, the media compression system provides the user commuting to work with a video playback speed and selected audio segments for playback such that the user may catch-up on the True Detective episode within their commute to work.

In some embodiments, the media compression system may stop playback of the media asset if it determines the difference between playback is too large. At a particular time during playback of the video asset, the media compression system determines an offset audio value based on the difference between the particular time of the audio segment and particular time of the video segment. For example, at the time of 15:00 of the video playback, the video playback speed may be 1.5×. The time of the audio segment may be further ahead than the video timestamp due to the modification of the audio segments as low priority segments have been removed. Thus, the particular time of the audio segment may be further ahead than the video timestamp—for example, here the particular time of the audio segment may be 17:50.

The media compression system may determine an offset audio value based on the difference between the particular time of the audio segment and the particular time of the video segment. Based on the previous example, the offset would be 17:50-15:00 resulting in 2:50; minutes. The media compression system may determine whether the offset audio value exceeds a predefined maximum offset value. In response to the determination that the offset audio value exceeding the predefined maximum offset value, the media compression system stops generation for playback of the video segment and the remaining audio segments. Here, if the maximum offset value is 2:00 minutes, then the determined offset audio value of 2:50 exceeds the maximum offset value and the media compression system halts generation for playback of the video and audio segments. In some variants, the predefined maximum offset value is based at least in part on metadata. This metadata may include user preference information, user device history information, crowdsourced user device information, locational device information for a specific media service, and various other user/device/demographical information. The media compression system may retrieve the predefined maximum offset, and/or metadata from the data structure.

Figure 1C:
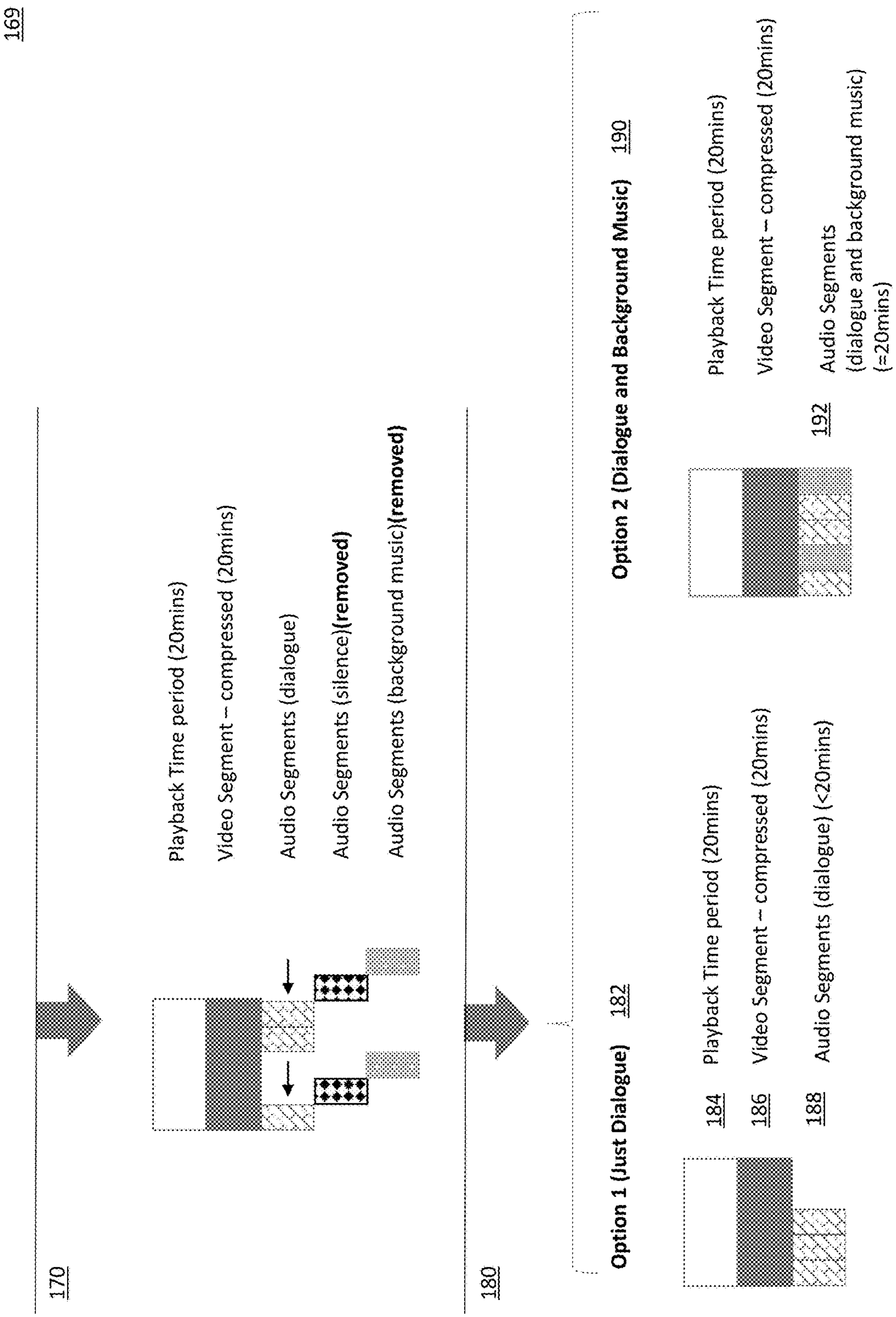
FIG. 1C shows an illustrative diagram of the media compression system creating multiple compression options, in accordance with some embodiments of the disclosure.

In some embodiments, after determining that the duration of remaining audio segments does not exceed the received playback time period the media compression system may present various compression options to the electronic device for selection. The compression options include distinct audio segments for selection. FIG. 1C shows an illustrative diagram 169 of the media compression system creating multiple compression options, in accordance with some embodiments of the disclosure. Subsequent to the determination 170 where the segments have been selected for compression, the media compression system presents various compression options 180 to the electronic device. For example, in Option 1 (182), the playback time 184 is equal to the video segment playback 186 which has been compressed. The audio segments 188 have been compressed to less than the entirety of the playback time. In this option, the only audio segment is dialogue. Alternatively, Option 2 (190) is provides for the same video segment playback speed but the audio segments 192 now include another type of audio segment, namely background music. Both the background music and dialogue fit within the twenty-minute playback time period.

In some embodiments disclosed herein, the disclosed techniques calculate a varied time for each audio segment for use during catch-up playback. The media compression system may calculate a modified time for each audio segment for use during accelerated playback based on (1) corresponding priority weight of that audio segment, (2) the received playback time period, and (3) a duration of that audio segment, wherein a sum of the modified time for each audio segment equals the received playback time period. FIG. 3 shows an illustrative diagram 300 of an exemplary varied audio segment compression determination, in accordance with some embodiments of the disclosure. The media compression system 300 may calculate the playback time period using various computer and mathematical based techniques. For example, in 320 the media compression system provides for the length of each audio segments to be divided by a corresponding priority weight and a variable x. The playback time period is provided, and the variable x may be solved using methods known to a person of ordinary skill in the art. In 330, the playback time period is inserted as fifteen minutes, while each of the audio segment lengths are also inputted. The corresponding priority weights are listed as 1, 2, 2.5, and 3 for dialogue, foreground audio, background audio, and silence respectively. The media compression system, via control circuitry, solves the equation at 340 for the variable x to be 1.08. The media compression system then determines that the playback speed to be 1.08×, 2.16×, 2.7×, and 3.24× for each of dialogue, foreground audio, background audio, and silence respectively.

The media compression system may determine an accelerated playback speed for each audio segment based on the modified time for that audio segment and the duration of that audio segment. The media compression system may then generate, for playback, the video segment based on the video playback speed, and the audio segments based on the accelerated playback speed for each audio segment.

In some embodiments, the media compression system may calculate a second modified time for each audio segment for use during accelerated playback based on (1) corresponding priority weight of that audio segment, (2) the received playback time period, (3) a duration of that audio segment, and (4) a bias for a specific audio segment. A sum of the modified time for each audio segment equals the received playback time period. This approach differs from the approach above as at least one of the second modified time for each audio segment is different than the modified time for each audio segment due to the bias for a specific audio segment.

In response to generating for display the interface for the electronic device providing the selection of the playback of the audio segments, the media compression system may receive selection of a selected playback speed and generate for playback the video segment based on the video playback speed, and the plurality of audio segments based on the selected playback speed. For example, the media compression system may provide an electronic device interface with two options for playback speed, a first playback speed without a bias for a specific audio segment, and a second playback speed with a bias for the specific audio segment. The user selects the second option, and the media compression system generates the media asset for playback at the rates of the second playback speed.

In some variants, the bias may be received from a content producer of the media asset. For example, if the user if watching True Detective, the bias for the audio segments may be retrieved from Home Box Office (HBO) as the provider of this media asset. HBO may specify that dialogue, environmental sound effects and foreground music are given specific biases (e.g., weighted values for calculation). In other examples, a service provider of media assets may provide the bias for the audio segments (e.g., YouTube, DIRECTV, Hulu, Comcast, Amazon: Prime Video, and similar providers). The media compression system may retrieve the bias, and/or metadata from the data structure.

Figure 4:
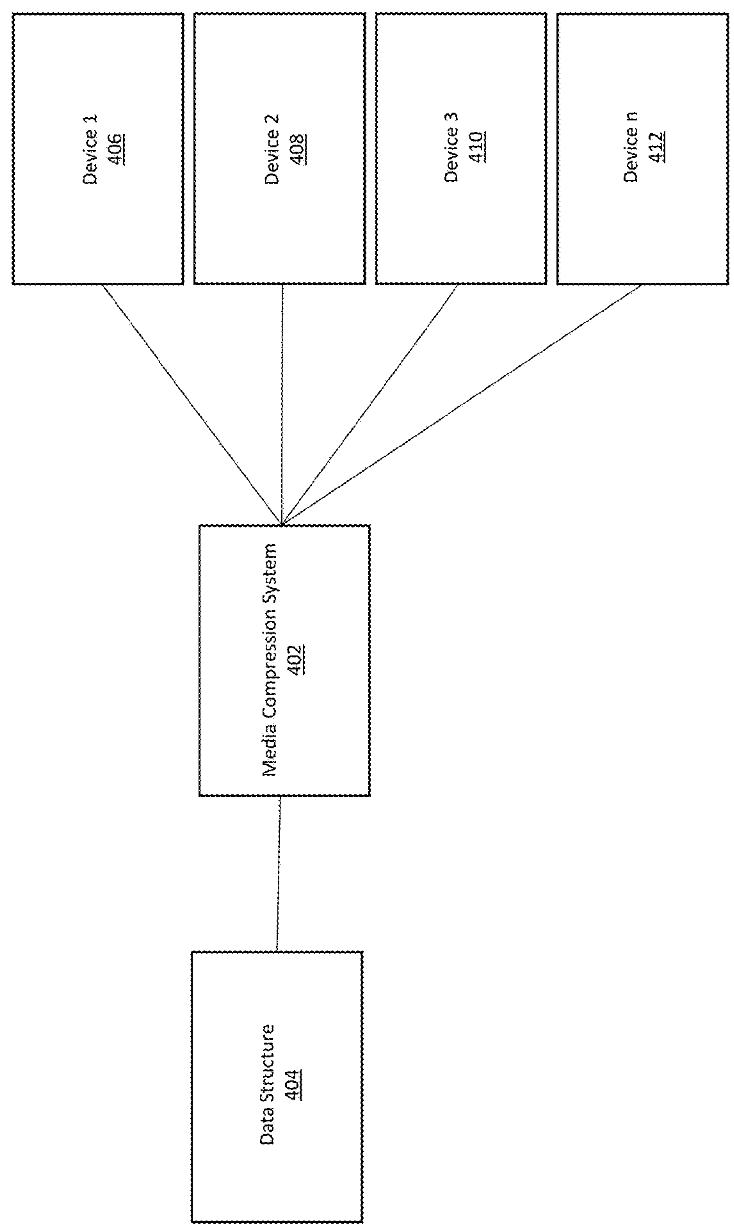
FIG. 4 shows an illustrative system diagram of the media compression system, data structure, and multiple electronic devices, in accordance with some embodiments of the disclosure.
Figure 7:
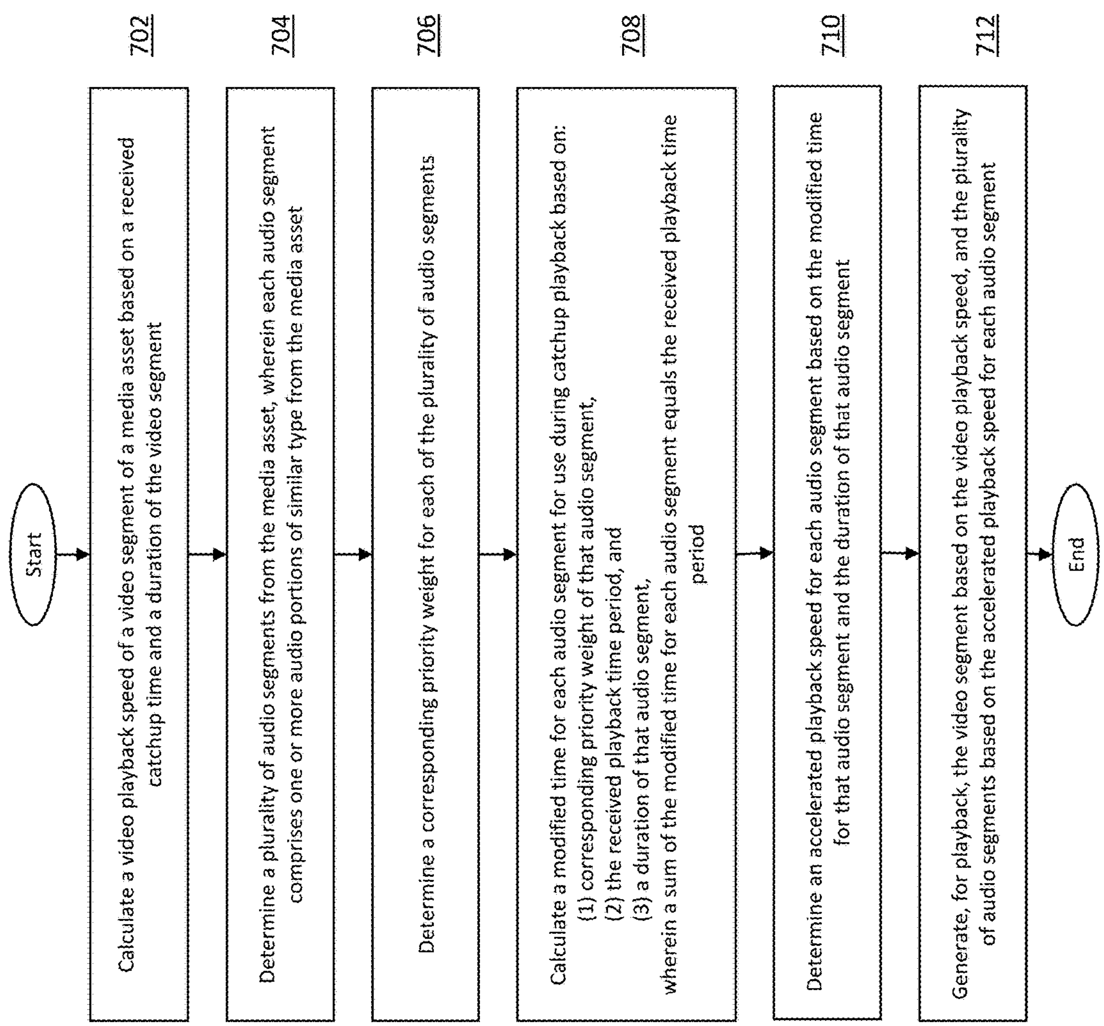
FIG. 7 is an illustrative flowchart of a process for varied audio segment compression for accelerated playback of media assets, in accordance with some embodiments of the disclosure.

FIG. 4 shows an illustrative system diagram of the media compression system, data structure, and multiple electronic devices, in accordance with some embodiments of the disclosure. The media compression system 402 may be of any hardware that provides for selective audio segment compression for accelerated playback of media assets. The media compression system may be communicatively coupled to multiple electronic devices in a defined environment (e.g., device 1 (406), device 2 (408), device 3 (410), device n (412)). The media compression system may be communicatively coupled to a data structure 404. A further detailed disclosure on the media compression system can be seen in FIG. 7 showing an illustrative block diagram of the media compression system, in accordance with some embodiments of the disclosure.

In some embodiments, the media compression system may be implemented remote from the electronic devices 1-*n* such as a cloud server configuration. In yet other embodiments, the media compression system may be integrated into electronic devices 1-*n*. Any of the system modules (e.g., media compression system, data structure, electronic devices) may be any combination of shared or disparate hardware pieces that are communicatively coupled.

The electronic devices (e.g., device 1 (406), device 2 (408), device 3 (410), device n (412)) may be any device that have properties to generates for playback media assets. In other embodiments, the electronic devices may also have display capabilities to display media assets for playback. For example, the electronic device may be any processor-based system, sensor, state machine, retrofit network-connected device. In various systems, devices can include, but are not limited to, network-connected devices (e.g., Internet-of-Things devices), smartphones, personal computers, smart appliances, consumer electronics, industrial equipment, security systems, digital twin systems, and similar system.

The data structure 404 may be any database, server, computing device that contains memory for storing metadata associated with media assets, user preferences, historical information about user device information, or other related information to media assets and/or devices 1-*n*. In some variants, the data structure may be a content producer database which owns the media content (e.g., Warner Bros, Disney, Pixar, NBC, ABC, and/or other content producers). In other variants, the data structure may be a service provider database (e.g., database operated by Hulu, YouTube, Netflix, Amazon Prime Video, and/or other service providers).

Figure 5:
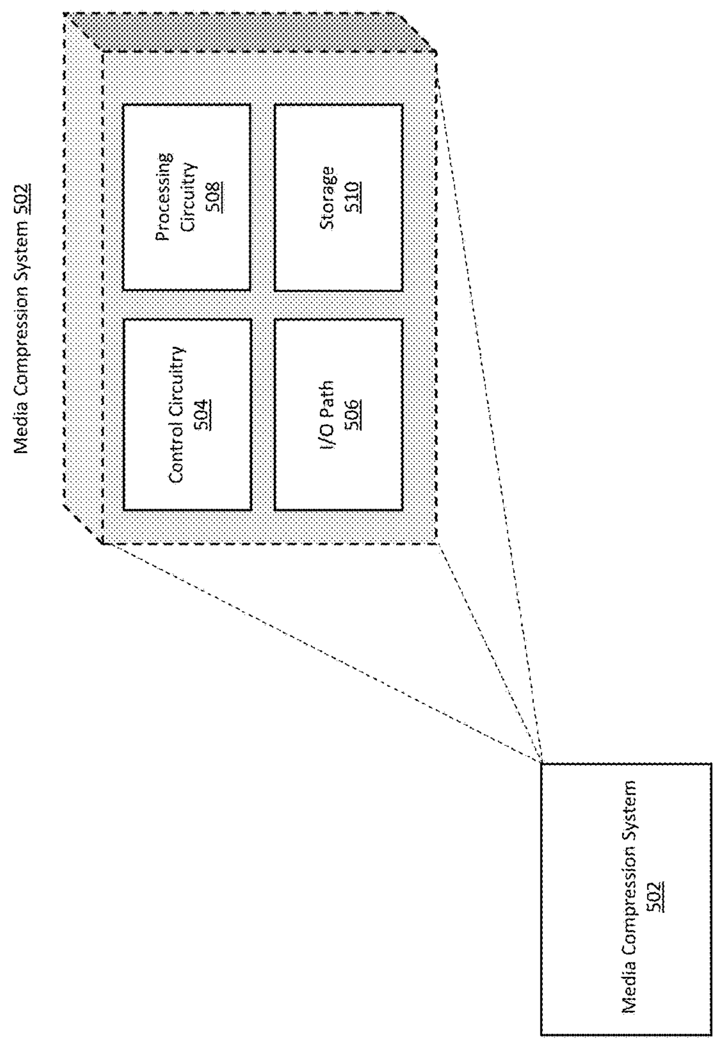
FIG. 5 shows an illustrative block diagram of the media compression system, in accordance with some embodiments of the disclosure.

FIG. 5 shows an illustrative block diagram 500 of the media compression system 502, in accordance with some embodiments of the disclosure. In some embodiments, the media compression system may be communicatively connected to a user interface. In some embodiments, the media compression system may include processing circuitry, control circuitry, and storage (e.g., RAM, ROM, hard disk, removable disk, etc.). The media compression system may include an input/output path 506. I/O path 506 may provide device information, or other data over a local area network (LAN) or wide area network (WAN), and/or other content and data to control circuitry 504, which includes processing circuitry 508 and storage 510. Control circuitry 504 may be used to send and receive commands, requests, and other suitable data using I/O path 506. I/O path 506 may connect control circuitry 504 (and specifically processing circuitry 508) to one or more communications paths.

Control circuitry 504 may be based on any suitable processing circuitry such as processing circuitry 508. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media compression system stored in memory (e.g., storage 510).

Memory may be an electronic storage device provided as storage 510 which is part of control circuitry 504. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The media compression system 502 may be coupled to a communications network. Communications network may be one or more networks including the Internet, a mobile phone network, mobile voice or data network (e.g., a 5G, 4G or LTE network), mesh network, peer-2-peer network, cable network, or other types of communications network or combinations of communications networks. Paths may separately or together include one or more communications paths, such as, a satellite path, a fiber-optic path, a cable path, a path that supports Internet communications, free-space connections (e.g., for broadcast or other wireless signals), or any other suitable wired or wireless communications path or combination of such paths.

Figure 6:
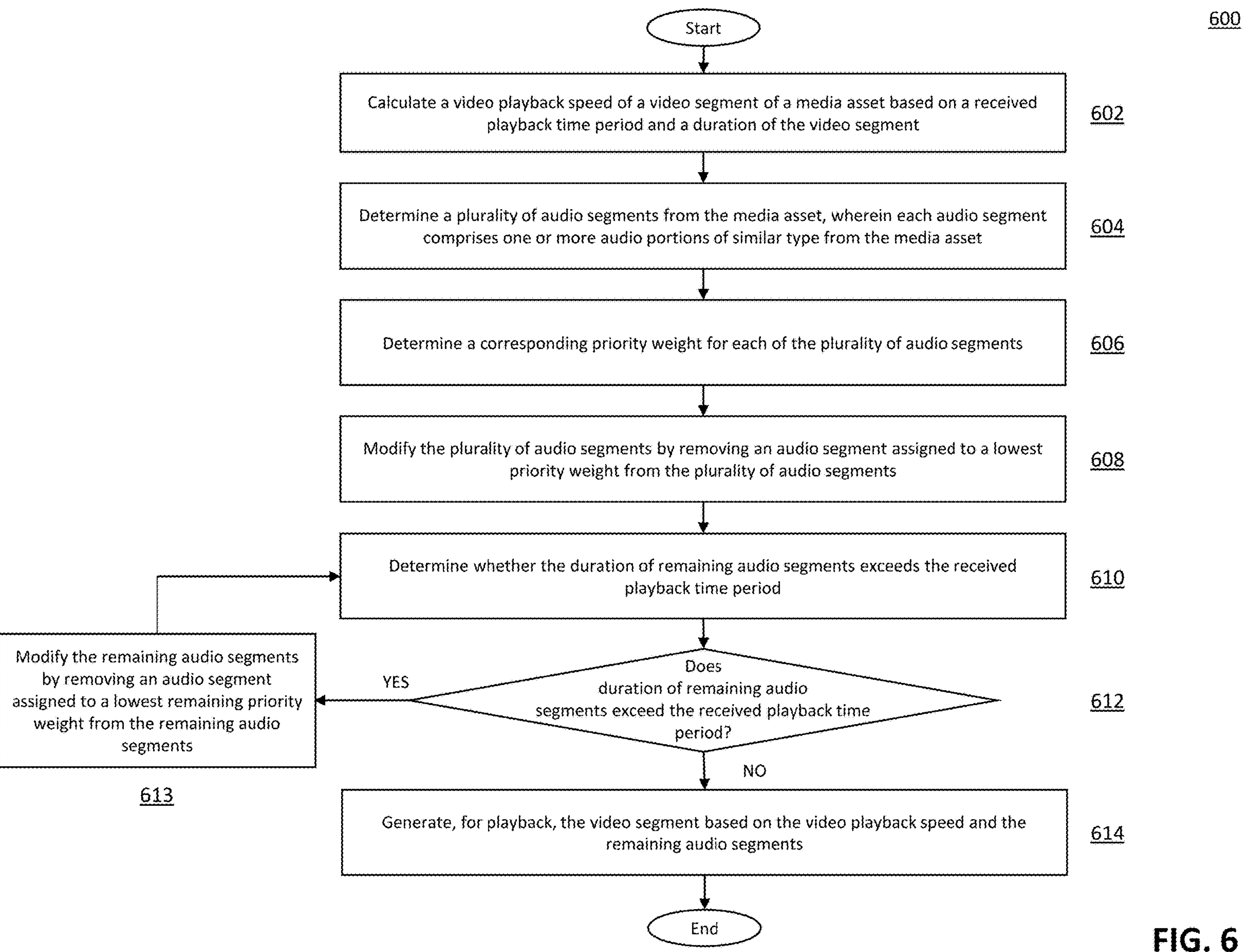
FIG. 6 is an illustrative flowchart of a process for selective audio segment compression for accelerated playback of media assets, in accordance with some embodiments of the disclosure.

FIG. 6 is an illustrative flowchart of a process for selective audio segment compression for accelerated playback of media assets, in accordance with some embodiments of the disclosure. Process 600, and any of the following processes, may be executed by control circuitry 504 (e.g., in a manner instructed to control circuitry 504 by the media compression system). Control circuitry 504 may be part of media compression system 502, or of a remote server separated from the control system by way of a communication network, or distributed over a combination of both.

At 602, the media compression system, by control circuitry 504, calculates a video playback speed of a video segment of a media asset based on a received playback time period and a duration of the video segment. The media compression system may receive the received playback time period through the I/O path 506 which may be coupled to an electronic device 408-412. The media compression system may utilize processing circuitry 508 to calculate the video playback speed of the video segment of the media asset. The media compression system may receive the duration of the video segment through the I/O path 506 which may be coupled to a data structure 404 or alternatively from storage 510.

At 604, the media compression system, by control circuitry 504, determines a plurality of audio segments from the media asset, wherein each audio segment comprises one or more audio portions of similar type from the media asset. The media compression system may determine processing circuitry 508 to determine a plurality of audio segments from the media asset (e.g., applying techniques such as Fourier Transform).

At 606, the media compression system, by control circuitry 504, determines a corresponding priority weight for each of the plurality of audio segments. The media compression system may utilize processing circuitry 508 to determines a corresponding priority weight. The media compression system may information such as predefined priority scheme containing a set of audio portion type parameters via the I/O path 506 which may be coupled to a data structure 404.

At 608, the media compression system, by control circuitry 504, modifies the plurality of audio segments by removing an audio segment assigned to a lowest priority weight from the plurality of audio segments. At 610, the media compression system, by control circuitry 504, determines whether the duration of remaining audio segments exceeds the received playback time period. If, at 612, control circuitry 504 determines "Yes," the duration of remaining audio segments exceeds the received playback time, the media compression, by control circuitry 504, modifies, at 613, the remaining audio segments by removing an audio segment assigned to a lowest remaining priority weight from the remaining audio segments.

If, at 612, control circuitry determines "No," the duration of remaining audio segments does not exceed the received playback time period, the process advances to 614. At 614, control circuitry 504 generates, for playback, the video segment based on the video playback speed and the remaining audio segments. In some embodiments, the media compression system transmits generated playback instructions to an electronic device 406-412 via the I/O path 504.

FIG. 7 is an illustrative flowchart of a process for varied audio segment compression for accelerated playback of media assets, in accordance with some embodiments of the disclosure. At 702, the media compression system, by control circuitry 504, calculates a video playback speed of a video segment of a media asset based on a received playback time period and a duration of the video segment. The media compression system may receive the received playback time period through the I/O path 506 which may be coupled to an electronic device 408-412. The media compression system may utilize processing circuitry 508 to calculate the video playback speed of the video segment of the media asset. The media compression system may receive the duration of the video segment through the I/O path 506 which may be coupled to a data structure 404.

At 704, the media compression system, by control circuitry 504, determines a plurality of audio segments from the media asset, wherein each audio segment comprises one or more audio portions of similar type from the media asset. The media compression system may determine processing circuitry 508 to determine a plurality of audio segments from the media asset (e.g., applying techniques such as Fourier Transform).

At 706, the media compression system, by control circuitry 504, determines a corresponding priority weight for each of the plurality of audio segments. The media compression system may utilize processing circuitry 508 to determines a corresponding priority weight. The media compression system may information such as predefined priority scheme containing a set of audio portion type parameters via the I/O path 506 which may be coupled to a data structure 404.

At 708, the media compression system, by control circuitry 504, calculates a modified time for each audio segment for use during catchup playback based on (1) corresponding priority weight of that audio segment, (2) the received playback time period, and (3) a duration of that audio segment, wherein a sum of the modified time for each audio segment equals the received playback time period. The media compression system may utilize processing circuity 508 to calculate the modified time. The media compression system may receive the duration of the audio segment and/or received playback time period through the I/O path 506 which may be coupled to a data structure 404 or alternatively from storage 510.

At 710, the media compression system, by control circuitry 504, determines an accelerated playback speed for each audio segment based on the modified time for that audio segment and the duration of that audio segment. At 712, the media compression system, by control circuitry 504, generates, for playback, the video segment based on the video playback speed, and the plurality of audio segments based on the accelerated playback speed for each audio segment. In some embodiments, the media compression system transmits generated playback instructions to an electronic device 406-412 via the I/O path 504.

Figure 8:
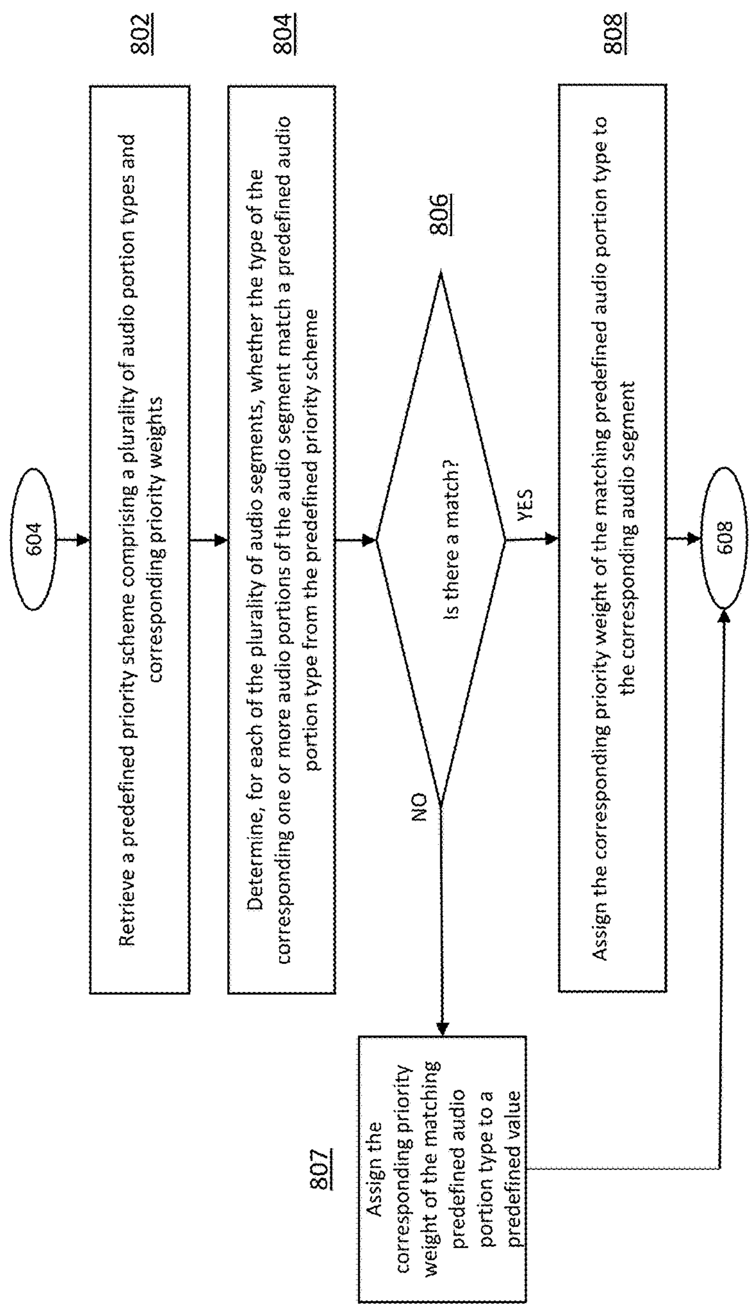
FIG. 8 is an illustrative flowchart of a process for determining a corresponding priority weight for each of the plurality of audio segments, in accordance with some embodiments of the disclosure.

FIG. 8 is an illustrative flowchart of a process for determining a corresponding priority weight for each of the plurality of audio segments, in accordance with some embodiments of the disclosure. At 802, the media compression system, by control circuitry 504, retrieves a predefined priority scheme comprising a plurality of audio portion types and corresponding priority weights. The media compression system may receive the predefined priority scheme through the I/O path 506 which may be coupled to a data structure 404. Alternatively, the media compression system may receive the predefined priority scheme from storage 510.

At 804, the media compression system, by control circuitry 504, determines for each of the plurality of audio segments, whether the type of the corresponding one or more audio portions of the audio segment match a predefined audio portion type from the predefined priority scheme. If, at 806, control circuitry 504 determines "No," the type of the corresponding one or more audio portions of the audio segment does not match a predefined audio portion type from the predefined priority scheme, the media compression, by control circuitry 504, at 807, assigns the corresponding priority weight of the matching predefined audio portion type to a predefined value.

If, at 806, control circuitry determines "Yes," the type of the corresponding one or more audio portions of the audio segment matches a predefined audio portion type from the predefined priority scheme, the process advances to 808. At 808, control circuitry 504 assigns the corresponding priority weight of the matching predefined audio portion type to the corresponding audio segment. In some embodiments, assignment is stored in storage 510.

Figure 9:
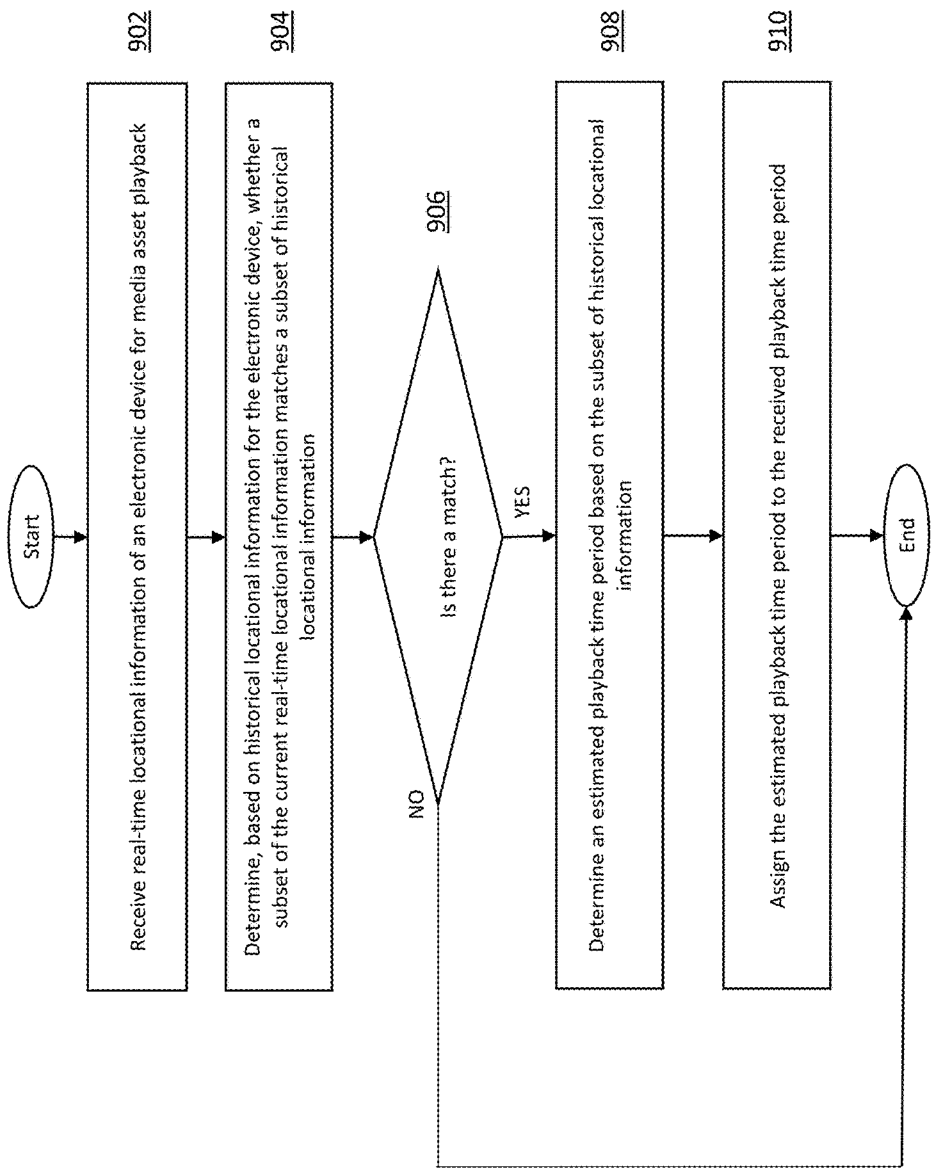
FIG. 9 is an illustrative flowchart of a process for assigning an estimated playback time period to the received playback time period, in accordance with some embodiments of the disclosure.

FIG. 9 is an illustrative flowchart of a process for assigning an estimated playback time period to the received playback time period, in accordance with some embodiments of the disclosure. At 902, the media compression system, by control circuitry 504, receives real-time locational information of an electronic device for media asset playback. The media compression system may receive the real-time locational information through the I/O path 506 which may be coupled to an electronic device 406-412.

At 904, the media compression system, by control circuitry 504, determines, based on historical locational information for the electronic device, whether a subset of the current real-time locational information matches a subset of historical locational information. If, at 906, control circuitry 504 determines "No," the subset of the current real-time locational information does not match the subset of historical locational information, the media compression, by control circuitry 504, proceeds to End.

If, at 906, control circuitry determines "Yes," the subset of the current real-time locational information matches a subset of historical locational information, the process advances to 908. At 908, control circuitry 504 determines an estimated playback time period based on the subset of historical locational information. At 910, control circuitry 504 assigns the estimated playback time period to the received playback time period.

It is contemplated that the steps or descriptions of FIGS. 6-9 may be used with any other embodiment of this disclosure. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIGS. 6-9.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selective audio segment compression for accelerated playback of a media asset by a service provider, wherein the media asset comprises a video segment and a plurality of audio segments, the method comprising:

calculating a video playback speed of the video segment of the media asset based on a received playback time period and an original duration of the video segment that is greater than the received playback time period;

receiving the plurality of audio segments of the media asset, wherein each audio segment of the plurality of audio segments comprises one or more audio portions of the media asset and wherein each audio segment corresponds to a respective particular time in the video segment;

identifying a corresponding audio type for each of the plurality of audio segments;

determining there are at least three different audio types among the corresponding audio types;

receiving a corresponding priority weight for each of the plurality of audio segments based on the respective audio type of each segment;

generating, based on the respective priority weight of each of the plurality of audio segments, at least two compression options, wherein a first of the at least two compression options provides audio segments of a single audio type and a second of the at least two compression options provides audio segments of more than one audio type and excludes at least one low priority weight audio segment;

receiving a selection of the second of the at least two compression options;

modifying the plurality of audio segments based on the selection of the second of the at least two compression options; and in response to determining that the duration of remaining audio segments does not exceed the received playback time period, generating, for playback, the video segment based on the video playback speed and the remaining audio segments, such that the video segment and fewer than all of the plurality of audio segments are played during the playback time period, and wherein the each of the remaining audio segments is played back at a speed based on the corresponding priority weight and duration of each of the remaining audio segments such that the remaining audio segments are played back at each respective particular time in the video segment.

2. The method of claim 1 further comprising:

in response to determining that the duration of the remaining audio segments exceeds the received playback time period, modifying the remaining audio segments by removing an audio segment assigned to a lowest remaining priority weight from the remaining audio segments.

3. The method of claim 2, wherein modifying the remaining audio segments comprises removing a plurality of audio segments assigned to one or more of the lowest remaining priority weights from the remaining audio segments.

4. The method of claim 1, wherein in response to determining that the duration of remaining audio segments does not exceed the received playback time period, generating, for playback, the video segment based on the video playback speed and the remaining audio segments further comprises:

calculating a time period by the difference between the received playback time period and the sum of all remaining audio segments;

retrieving the previously removed audio segment;

trimming the previously removed audio segment to a playback period matching the time period; and adding the trimmed removed audio segment to the remaining audio segments.

5. The method of claim 1, wherein determining a corresponding priority weight for each of the plurality of audio segments comprises:

retrieving a predefined priority scheme comprising a plurality of audio portion types and corresponding priority weights;

determining, for each of the plurality of audio segments, whether the type of the corresponding one or more audio portions of the audio segment match a predefined audio portion type from the predefined priority scheme; and in response to the determination that the type of the corresponding one or more audio portions of the audio segment matches the predefined audio portion type from the predefined priority scheme, assigning the corresponding priority weight of the matching predefined audio portion type to the corresponding audio segment.

6. The method of claim 5, wherein the predefined priority scheme is received from a content producer of the media asset.

7. The method of claim 1 further comprising:

receiving real-time locational information of an electronic device for media asset playback, wherein the real-time locational information indicates movement of the electronic device;

determining, based on historical locational information for the electronic device, whether a subset of the real-time locational information matches a subset of historical locational information;

responsive to the determination that the subset of the current real-time locational information matches the subset of historical locational information, determining an estimated playback time period based on the subset of historical locational information; and assigning the estimated playback time period to the received playback time period.

8. The method of claim 1, further comprising:

determining a dialogue audio segment from the plurality of audio segments;

at a particular time during playback:

determining an offset audio value based on the difference between the particular time of the audio segment and the particular time of the video segment;

determining whether the offset audio value exceeds a predefined maximum offset value; and in response to the determination that the offset audio value exceeds the predefined maximum offset value, stopping generation for playback of the video segment and the remaining audio segments.

9. The method of claim 1, wherein:

the method further comprises determining one or more audio segments as high priority audio segments;

modifying the remaining audio segments by removing an audio segment assigned to a lowest remaining priority weight from the remaining audio segments comprises determining whether the audio segment being removed is one of the one or more high priority audio segments; and in response to the determination that the audio segment being removed is one of the one or more high priority audio segments, stopping generation for playback of the video segment and the remaining audio segments.

10. The method of claim 9, wherein determinations of one or more audio segments as high priority audio segments are received from a content producer of the media asset.

11. A system for selective audio segment compression for accelerated playback of a media asset by a service provider, wherein the media asset comprises a video segment and a plurality of audio segments, comprising:

control circuitry configured to:

calculate a video playback speed of the video segment of the media asset based on a received playback time period and an original duration of the video segment that is greater than the received playback time period;

receive the plurality of audio segments of the media asset, wherein each audio segment of the plurality of audio segments comprises one or more audio portions of the media asset and wherein each audio segment corresponds to a respective particular time in the video segment;

identify a corresponding audio type for each of the plurality of audio segments;

determine there are at least three different audio types among the corresponding audio types;

receive a corresponding priority weight for each of the plurality of audio segments based on the respective audio type of each segment;

generate, based on the respective priority weight of each of the plurality of audio segments, at least two compression options, wherein a first of the at least two compression options provides audio segments of a single audio type and a second of the at least two compression options provides audio segments of more than one audio type and excludes at least one low priority weight audio segment;

receive a selection of the second of the at least two compression options;

modify the plurality of audio segments based on the selection of the second of the at least two compression options; and in response to determining that the duration of remaining audio segments does not exceed the received playback time period, generating, for playback, the video segment based on the video playback speed and the remaining audio segments, such that the video segment and fewer than all of the plurality of audio segments are played during the playback time period, and wherein the each of the remaining audio segments is played back at a speed based on the corresponding priority weight and duration of each of the remaining audio segments such that the remaining audio segments are played back at each respective particular time in the video segment.

12. The system of claim 11, wherein control circuitry is further configured, when determining a corresponding priority weight for each of the plurality of audio segments, to:

in response to determining that the duration of the remaining audio segments exceeds the received playback time period, modify the remaining audio segments by removing an audio segment assigned to a lowest remaining priority weight from the remaining audio segments.

13. The system of claim 12, wherein modifying the remaining audio segments comprises removing a plurality of audio segments assigned to one or more of the lowest remaining priority weights from the remaining audio segments.

14. The system of claim 11, wherein control circuitry if further configured, when in response to determining that the duration of remaining audio segments does not exceed the received playback time period, generating, for playback, the video segment based on the video playback speed and the remaining audio segments, is further configured to:

calculate a time period by the difference between the received playback time period and the sum of all remaining audio segments;

retrieve the previously removed audio segment;

trim the previously removed audio segment to a playback period matching the time period; and add the trimmed removed audio segment to the remaining audio segments.

15. The system of claim 11, wherein control circuitry is further configured, when determining a corresponding priority weight for each of the plurality of audio segments comprises, to:

retrieve a predefined priority scheme comprising a plurality of audio portion types and corresponding priority weights;

determine, for each of the plurality of audio segments, whether the type of the corresponding one or more audio portions of the audio segment match a predefined audio portion type from the predefined priority scheme; and in response to the determination that the type of the corresponding one or more audio portions of the audio segment matches the predefined audio portion type from the predefined priority scheme, assign the corresponding priority weight of the matching predefined audio portion type to the corresponding audio segment.

16. The system of claim 15, wherein the predefined priority scheme is received from a content producer of the media asset.

17. The system of claim 11, wherein the control circuitry is further configured to:

receive real-time locational information of an electronic device for media asset playback, wherein the real-time locational information indicates movement of the electronic device;

determine, based on historical locational information for the electronic device, whether a subset of the real-time locational information matches a subset of historical locational information;

responsive to the determination that the subset of the current real-time locational information matches the subset of historical locational information, determine an estimated playback time period based on the subset of historical locational information; and assign the estimated playback time period to the received playback time period.

18. The system of claim 11, wherein control circuitry is further configured to:

determine a dialogue audio segment from the plurality of audio segments;

at a particular time during playback:

determine an offset audio value based on the difference between the particular time of the audio segment and the particular time of the video segment; and determine whether the offset audio value exceeds a predefined maximum offset value; and in response to the determination that the offset audio value exceeds the predefined maximum offset value, stop generation for playback of the video segment and the remaining audio segments.

19. The system of claim 11, wherein:

the control circuitry of the system is further configured to determine one or more audio segments as high priority audio segments;

the control circuitry is further configured, when modifying the remaining audio segments by removing an audio segment assigned to a lowest remaining priority weight from the remaining audio segments, to determine whether the audio segment being removed is one of the one or more high priority audio segments; and in response to the determination that the audio segment being removed is one of the one or more high priority audio segments, stopping generation for playback of the video segment and the remaining audio segments.

20. The system of claim 19, wherein determinations of one or more audio segments as high priority audio segments are received from a content producer of the media asset.

* * * * *